US012651035B2

(12) United States Patent
Susa et al.

(10) Patent No.: US 12,651,035 B2
(45) Date of Patent: Jun. 9, 2026

(54) ARITHMETIC APPARATUS, METHOD, AND PROGRAM

(71) Applicants: NEC CORPORATION, Tokyo (JP); TOKYO INSTITUTE OF TECHNOLOGY, Tokyo (JP)

(72) Inventors: Yuki Susa, Tokyo (JP); Hidetoshi Nishimori, Tokyo (JP)

(73) Assignees: NEC CORPORATION, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 1252 days.

(21) Appl. No.: 17/519,850

(22) Filed: Nov. 5, 2021

(65) Prior Publication Data

US 2022/0147596 A1 May 12, 2022

(30) Foreign Application Priority Data

Nov. 10, 2020 (JP) ................................ 2020-187552

(51) Int. Cl.
| | |
|---|---|
| G06F 17/11 | (2006.01) |
| G06N 10/00 | (2022.01) |
| G06N 10/60 | (2022.01) |

(52) U.S. Cl.
CPC ............. *G06F 17/11* (2013.01); *G06N 10/00* (2019.01); *G06N 10/60* (2022.01)

(58) Field of Classification Search
CPC ......... G06F 17/11; G06N 10/00; G06N 10/60
See application file for complete search history.

(56) References Cited

U.S. PATENT DOCUMENTS

| | | | | |
|---|---|---|---|---|
| 2020/0334564 A1* | 10/2020 | Mohseni | ............... | G06F 9/4881 |
| 2021/0166148 A1* | 6/2021 | Matsuura | ............... | G06N 10/20 |
| 2021/0241143 A1* | 8/2021 | Amin | ....................... | G06N 5/04 |

FOREIGN PATENT DOCUMENTS

WO      2020/156680 A1      8/2020

OTHER PUBLICATIONS

Susa et al. in "Variational optimization of the quantum annealing schedule for the Lechner-Hauke-Zoller scheme" Phys. Rev. A 103, 022619, Feb. 2021, https://doi.org/10.1103/PhysRevA.103.022619 (Year: 2021).*
W. Lechner, "Quantum Approximate Optimization With Parallelizable Gates," in IEEE Transactions on Quantum Engineering, vol. 1, pp. 1-6, Oct. 2020, Art No. 3102206, doi: 10.1109/TQE.2020. 3034798 (Year: 2020).*
Shunji Matsuura et al., "Variationally Scheduled Quantum Simulation", arXiv:2003.09913v1; Mar. 24, 2020, pp. 1-2.
Wolfgang Lechner et al., "A quantum annealing architecture with all-to-all connectivity from local interactions", Sci Adv., Oct. 23, 2015, 6 pgs., vol. 1, No. e1500838.
Decision to Grant a Patent dated Jul. 30, 2024 from the Japanese Patent Office in Application No. 2020-187552.

* cited by examiner

*Primary Examiner* — Carlo Waje
(74) *Attorney, Agent, or Firm* — Sughrue Mion, PLLC

(57) ABSTRACT
An arithmetic apparatus includes an arithmetic unit configured to adjust an intensity schedule function in quantum annealing of a constraint term expressed by many-body interactions in an LHZ model by a hybrid algorithm that uses a value of the intensity schedule function at one time point or each of a plurality of time points as a variational parameter.

10 Claims, 17 Drawing Sheets

ADJUSTMENT OF PARAMETERS

RESULTS OF QUANTUM COMPUTING

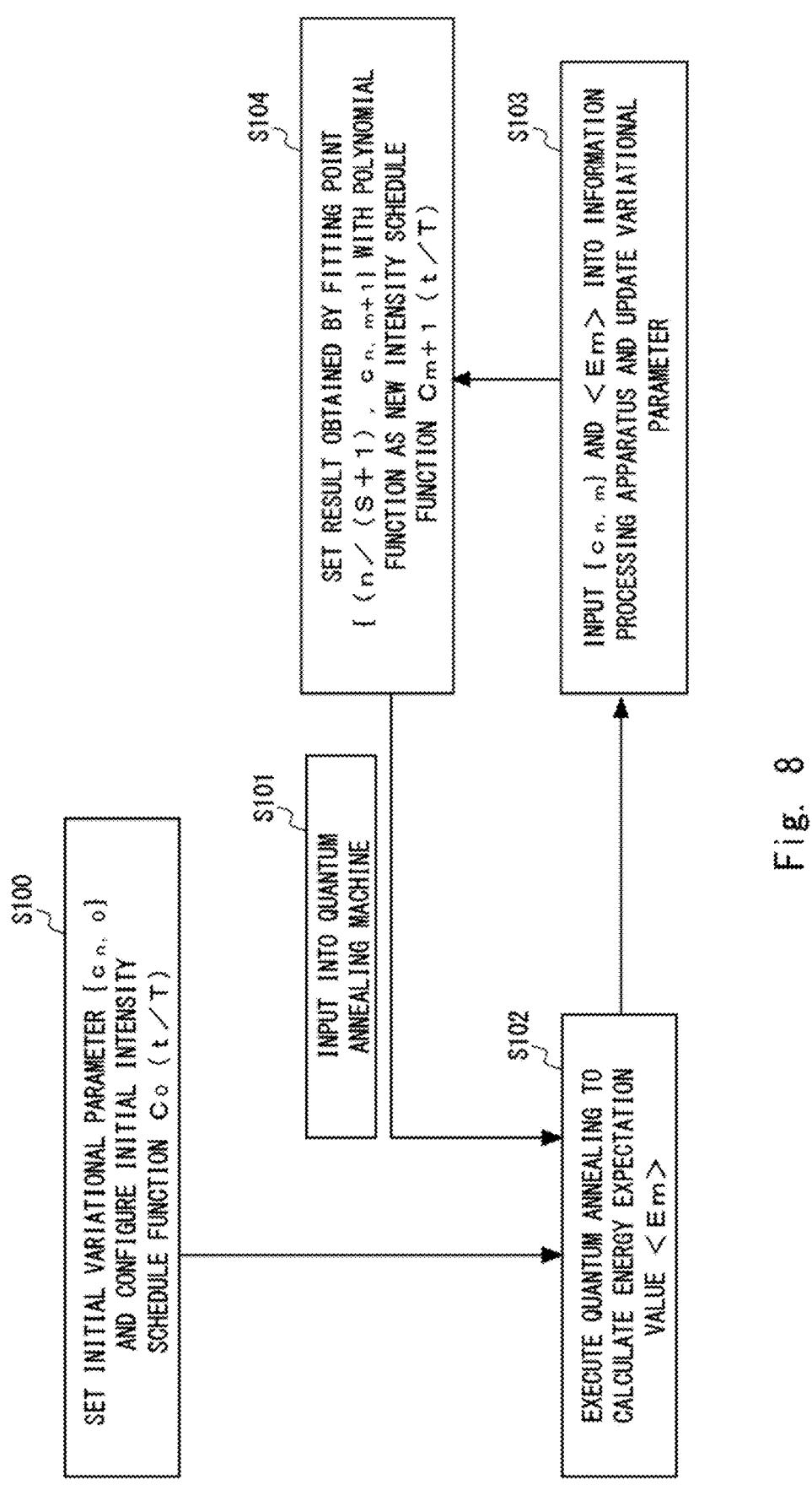

S100

SET INITIAL VARIATIONAL PARAMETER {$c_n$, $_o$} AND CONFIGURE INITIAL INTENSITY SCHEDULE FUNCTION $C_o$ ($t$/$T$)

S101

INPUT INTO QUANTUM ANNEALING MACHINE

S102

EXECUTE QUANTUM ANNEALING TO CALCULATE ENERGY EXPECTATION VALUE <$E_m$>

S103

INPUT {$c_n$, $_m$} AND <$E_m$> INTO INFORMATION PROCESSING APPARATUS AND UPDATE VARIATIONAL PARAMETER

S104

SET RESULT OBTAINED BY FITTING POINT {($n$/($S$+1), $c_n$, $_{m+1}$} WITH POLYNOMIAL FUNCTION AS NEW INTENSITY SCHEDULE FUNCTION $C_{m+1}$ ($t$/$T$)

Fig. 8

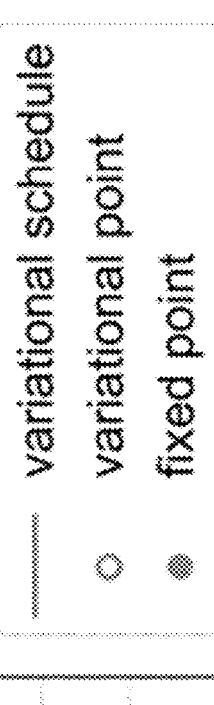
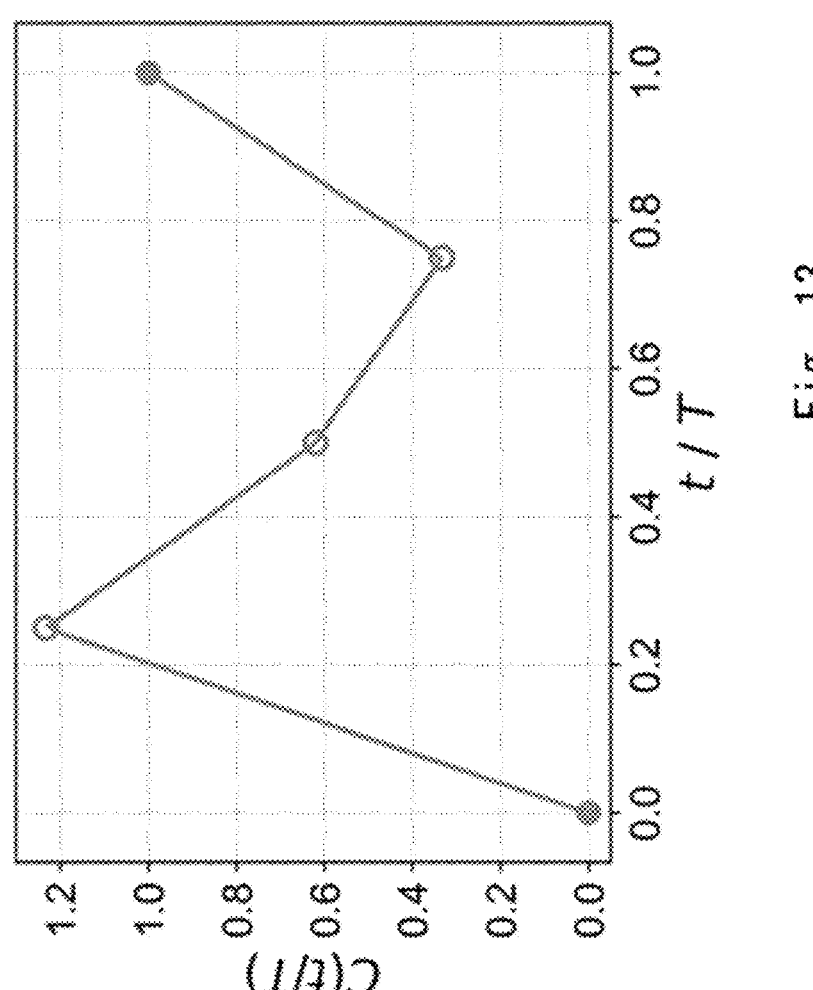
Fig. 13

ARITHMETIC APPARATUS, METHOD, AND PROGRAM

INCORPORATION BY REFERENCE

This application is based upon and claims the benefit of priority from Japanese patent application No. 2020-187552, filed on Nov. 10, 2020, the disclosure of which is incorporated herein in its entirety by reference.

TECHNICAL FIELD

The present disclosure relates to an arithmetic apparatus, a method, and a program, and in particular, to quantum annealing.

BACKGROUND ART

Quantum annealing is a method of obtaining a desired optimal solution by first applying quantum fluctuations to all the quantum bits and then gradually increasing the weight of interactions between quantum bits that express a predetermined combinatorial optimization problem while gradually decreasing the quantum fluctuations.

It is generally known that, when quantum annealing is executed, the longer the annealing time is (in other words, quantum annealing is adiabatic), the more likely it is that the optimal solution of a combinatorial optimization problem will be obtained. On the other hand, in actual machines, it is difficult to execute ideal quantum annealing for a long time due to noise or decoherence. Therefore, it is required to consider how to improve the efficiency of quantum annealing, assuming that it is performed in a short time and non-adiabatically.

One of methods for improving the efficiency of quantum annealing is a classical quantum hybrid algorithm by quantum annealing and a classical computing machine called a variationally scheduled quantum simulation algorithm (VSQS) (see S. Matsuura, S. Buck, V. Senicourt, and A. Zaribafiyan, arXiv:2003.09913. (hereinafter referred to as Non-Patent Literature 1)). This algorithm is for obtaining an appropriate intensity schedule function by repeatedly using a classical computing machine in order to obtain an optimal solution by quantum annealing.

On the other hand, an LHZ model has been proposed as an architecture for performing quantum annealing (see W. Lechner, P. Hauke, and P. Zoller, Sci Adv 1, (2015): e1500838). The LHZ model is known to be logically equivalent to the Ising model and is based on many-body interactions. The LHZ model is expressed by a local field in quantum bits and many-body interactions between quantum bits.

SUMMARY

There has been a problem that it is difficult to improve the efficiency of quantum annealing on the above LHZ model. In this connection, technique disclosed in Non-Patent Literature 1 is not one in which the classical quantum hybrid algorithm is applied to the quantum annealing on the LHZ model.

The present disclosure has been made in order to solve the above problem. That is, the aim of the present disclosure is to provide an arithmetic apparatus, a method, and a program that improve the efficiency of quantum annealing on the LHZ model.

An arithmetic apparatus according to the present disclosure includes an arithmetic unit configured to adjust an intensity schedule function in quantum annealing of a constraint term expressed by many-body interactions in an LHZ model by a hybrid algorithm that uses a value of the intensity schedule function at one time point or each of a plurality of time points as a variational parameter. An arithmetic method according to the present disclosure includes adjusting an intensity schedule function in quantum annealing of a constraint term expressed by many-body interactions in an LHZ model by a hybrid algorithm that uses a value of the intensity schedule function at one time point or each of a plurality of time points as a variational parameter.

An arithmetic program according to the present disclosure causes a computer to execute processing of adjusting an intensity schedule function in quantum annealing of a constraint term expressed by many-body interactions in an LHZ model by a hybrid algorithm that uses a value of the intensity schedule function at one time point or each of a plurality of time points as a variational parameter.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 8 is a flowchart showing a flow of processing in a hybrid algorithm executed by the arithmetic apparatus according to a second example embodiment;

FIG. 13 is a graph showing an intensity schedule function obtained by connecting variational parameters by a broken line in a problem for which the optimal solution is obvious ($J_k$=0.2);

EXAMPLE EMBODIMENT

Prior to giving a description of the following example embodiments, outlines of quantum annealing and an LHZ model will be given. Quantum annealing, which is a general-purpose approximate solution method for combinatorial optimization problems such as the traveling salesman problem, is a method of searching for an optimal set of variable values based on a set evaluation (energy) function. The evaluation function can be expressed as shown in Expression (1) as the Hamiltonian of the Ising model.

$$H = -\sum_{i<j}^{N} J_{ij}\sigma_i^z\sigma_j^z - \sum_{i=1}^{N} h_i\sigma_i^z \qquad (1)$$

The symbol $\sigma_i^z$ is a binary variable (bit) that takes +1 or −1, $J_{ij}$ denotes a correlation coefficient between variables, and $h_i$ denotes a local bias. The symbols $J_{ij}$ and $h_i$ are given in accordance with a combinatorial optimization problem to be solved. The symbol $\sigma_i^z$ denotes a z-component of a spin. As will be described later, quantum annealing uses a transverse magnetic field as quantum fluctuations. It is assumed that the direction of the transverse magnetic field is an x direction.

Quantum annealing is a solution that uses physical phenomena (natural phenomena). The procedure of quantum annealing includes (1) setting an evaluation function of a problem to be solved, (2) applying a transverse magnetic field (quantum fluctuations) to all the quantum bits to create a superposed state (initialization), (3) gradually weakening the transverse magnetic field, and (4) obtaining a combination of quantum bits that minimizes the energy. This process is expressed by Expression (2).

$$H(t) = -\left(1-\frac{t}{T}\right)\sum_{i=1}^{N}\sigma_i^x - \frac{t}{T}\left(\sum_{i<j}^{N} J_{ij}\sigma_i^z\sigma_j^z + \sum_{i=1}^{N} h_i\sigma_i^z\right) \qquad (2)$$

The symbol t denotes a time parameter that represents the time in the process of quantum annealing. The symbol T is an annealing time for executing quantum annealing. That is, t=0 when annealing is started and t=T when annealing is completed. It can also be considered that (t/T) is time. The time (t/T) is 0 when annealing is started and the time (t/T) is 1 when annealing is completed. The symbol $\sigma_i^x$ is an x-component of the spin and the first term on the right side corresponds to the quantum fluctuations. The quantum fluctuation term serves as a driver for executing quantum annealing. When t=0, the spin is oriented in the x direction due to the transverse magnetic field. When t=T, the spin is in a state that corresponds to the ground state of the Ising model, and is oriented in the +z direction or the −z direction.

Figure 1:
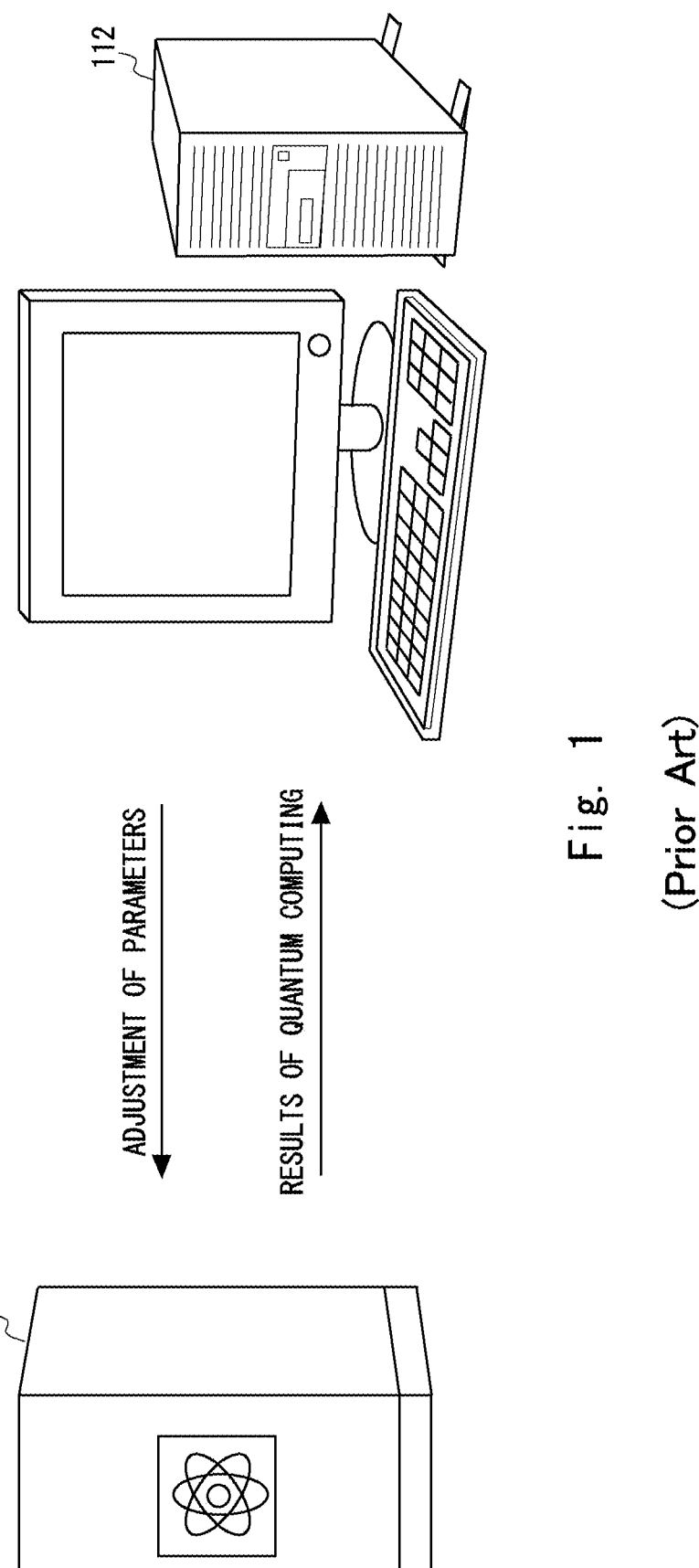
FIG. 1 is a schematic view showing an outline of a hybrid algorithm.

One known method of improving the efficiency of quantum annealing in the Ising model is a hybrid algorithm. FIG. 1 is a schematic view showing an outline of the hybrid algorithm. The hybrid algorithm improves the efficiency of quantum annealing by updating parameters called variational parameters using a quantum computing machine 111 and an information processing apparatus 112.

Hereinafter, variational parameters will be specifically described. A weighting coefficient (1−t/T) granted to the first term on the right side of Expression (2) is denoted by A(t) and a weighting coefficient (t/T) granted to the second term on the right side is denoted by B(t). Then, a special Hamiltonian is added to Expression (2) and a weighting coefficient for this Hamiltonian is denoted by C(t). Here, the annealing time T is divided into S sections and values of A(t), B(t), and C(t) in each section are denoted by variational parameters $\{a_l, b_m, c_n\}$.

Referring once again to FIG. 1, a flow of the hybrid algorithm will be described. The hybrid algorithm searches for a combination (close to the optimal solution) in which an energy expectation value is small. The quantum computing machine 111 executes quantum computing using A(t), B(t), and C(t) which are based on the variational parameters $\{a_l, b_m, c_n\}$ received from the information processing apparatus 112, and passes the energy expectation value and the quantum state to the information processing apparatus 112 as a result of the quantum computing. The energy expectation value is also referred to as a cost value and the quantum state is also referred to as a combination. When A(t), B(t), and C(t) are generated, the variational parameters $\{a_l, b_m, c_n\}$ may be connected by a broken line. However, when the variational parameters $\{a_l, b_m, c_n\}$ are approximated by a broken line, it is possible that the hardware that implements the quantum state may not be appropriately controlled. The information processing apparatus 112 adjusts the variational parameters $\{a_l, b_m, c_n\}$ in such a way that the energy expectation value can be further decreased, and passes the updated variational parameters $\{a_{l+1}, b_{m+1}, c_{n+1}\}$ to the quantum computing machine 111. By repeating the above processing, A(t), B(t), and C(t) are optimized.

When the Ising model expressed by Expression (1) is to be implemented, it is required to use a fully connected Ising model where all the bits are correlated with each other. When the Ising model is implemented by hardware, as illustrated in FIG. 3, it is difficult to implement it on a two-dimensional plane since long-distance connection of wires or crossing of wires (entanglement of wires) occurs.

Figure 2:
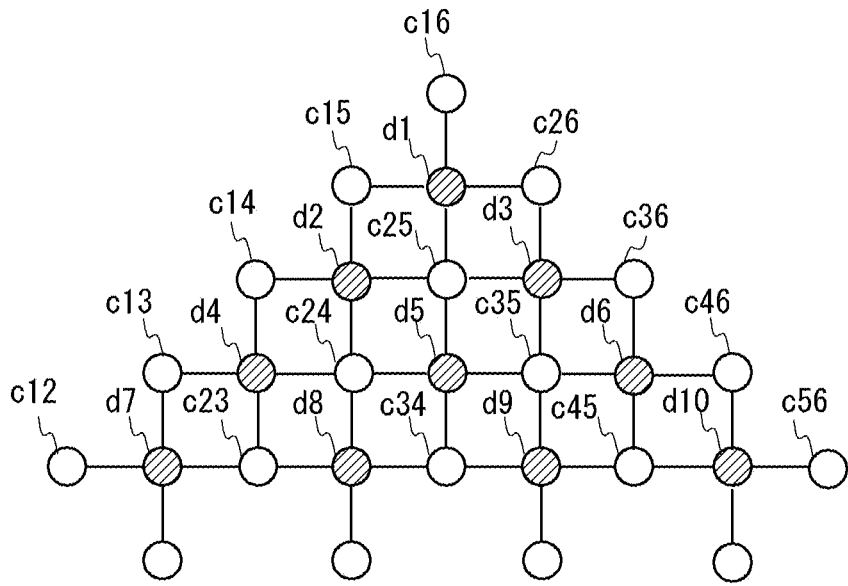
FIG. 2 is a schematic view showing an outline of an LHZ model.

In order to solve the above problem, an LHZ model as shown in FIG. 2 has been proposed. It is known that the LHZ model is a model that is logically equivalent to the Ising model, and is based on many-body interactions. The LHZ model can be implemented using hardware. The LHZ model is an architecture expressed by a local field in quantum bits and four-body interactions between quantum bits.

Figure 3:
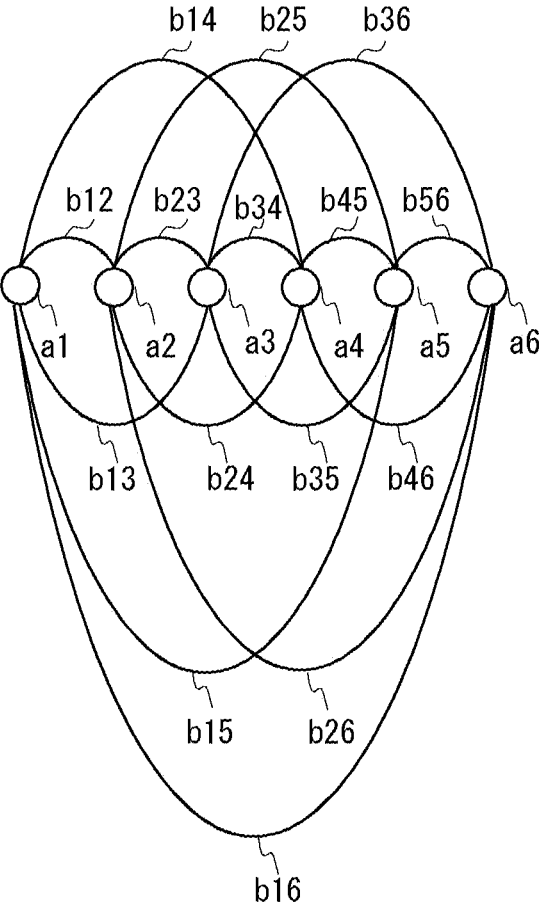
FIG. 3 is a schematic view showing an outline of a fully connected Ising model.

On the other hand, FIG. 3 represents the above fully connected Ising model. Hereinafter, a relation between the LHZ model shown in FIG. 2 and the fully connected Ising model shown in FIG. 3 will be described. Quantum bits a1-a6 in FIG. 3 are quantum bits in the fully connected Ising model. Couplings b12-b56 represent couplings between the quantum bits a1-a6 in the fully connected Ising model. For example, the coupling b12 represents the coupling between the quantum bits a1 and a2.

The quantum bits (physical bits) of the LHZ model shown in FIG. 2 are quantum bits c12-c56. The quantum bits c12-c56 correspond to the couplings b12-b56 shown in FIG. 3. For example, the coupling b12 of the fully connected Ising model corresponds to the quantum bit c12 of the LHZ model. Interactions d1-d10 indicate the many-body interactions in the LHZ model. For example, the interaction d1 represents four-body proximity interactions of the quantum bits c15, c16, c25, and c26. When the LHZ model is used, the number of physical bits K that are required to express the N logical bit is $N(N-1)/2$. When the LHZ model is used, Hamiltonian is expressed by Expression (3).

$$H_{LHZ} = -\sum_{k}^{K} J_k \sigma_k^z - \sum_{l}^{L} \sigma_{(l,n)}^z \sigma_{(l,s)}^z \sigma_{(l,e)}^z \sigma_{(l,w)}^z \tag{3}$$

The first term on the right side in Expression (3) is the replacement of $J_{ij}$ in Expression (1) with $J_k$. The second term on the right side in Expression (3), which is a term that represents a constraint condition that the quantum bits should satisfy, indicates the condition that the product of the four quantum bits around each interaction is 1. The symbol l (l indicates the lower-case alphabet of "L") is a parameter that represents a constraint condition and the number L of constraint conditions is $(N-1)(N-2)/2$.

In Expression (3), the second term on the right side, which is a term representing a constraint condition imposed between quantum bits, is called a constraint term. Further, in Expression (3), the first term on the right side is called an objective term. In this way, the constraint term is expressed by many-body interactions of quantum bits. It is known that it is difficult to solve some of the combinatorial optimization problems involving many-body interactions by quantum annealing. Note that each of L terms representing the constraint condition in Expression (3) may be considered as a constraint term. That is, it can be considered that Expression (3) includes a plurality of constraint terms.

In the aforementioned processing, it seems that information on the local field (the second term on the right side in Expression (1)) is not taken into account in Expression (3). Even when a local field is present, however, it is possible to include information on the local field in Expression (3), assuming that there is a hidden variable $\sigma_0^z$ as shown in Expression (4). In this case, $\sigma_0^z$ is set to be 1 when the quantum bits of the LHZ model are decoded into the quantum bits of the Ising model.

$$H = -\sum_{i<j}^{N} J_{ij} \sigma_i^z \sigma_j^z - \sum_{i=1}^{N} h_i \sigma_i^z \sigma_0^z \tag{4}$$

Hereinafter, with reference to the drawings, example embodiments will be described. Since the drawings are in a simplified form, the technical scope of the example embodiments should not be narrowly interpreted on the basis of the illustration of the drawings. Further, the same components are denoted by the same reference symbols and overlapping descriptions will be omitted.

First Example Embodiment

Figure 4:
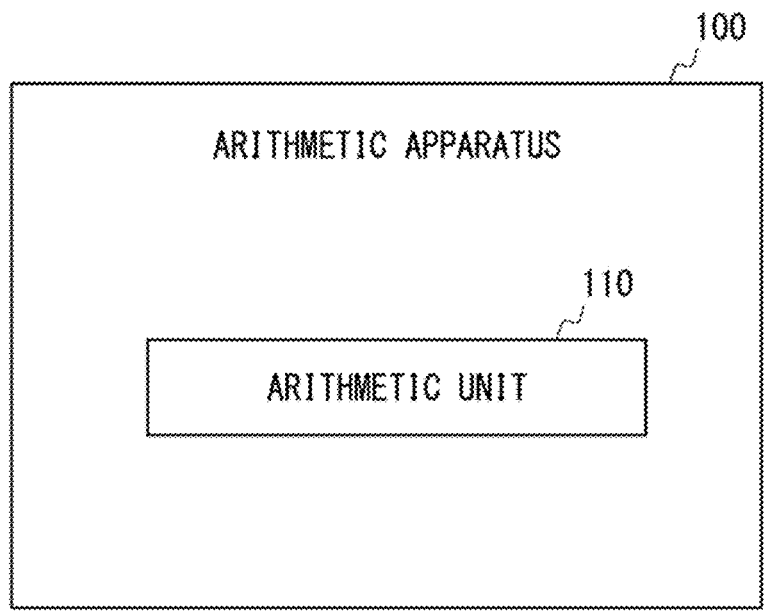
FIG. 4 is a block diagram showing a configuration of an arithmetic apparatus according to a first example embodiment.

Hereinafter, with reference to the drawings, example embodiments of the present disclosure will be described. FIG. 4 is a block diagram showing a configuration of an arithmetic apparatus 100 according to a first example embodiment. The arithmetic apparatus 100 includes an arithmetic unit 110.

The arithmetic unit 110 adjusts an intensity schedule function in quantum annealing of a constraint term expressed by many-body interactions in an LHZ model. The intensity schedule function is C(t/T) in Expression (5) that indicates the process of quantum annealing on the LHZ model.

$$H_{LHZ}(t) = \tag{5}$$
$$-\left(1 - \frac{t}{T}\right)\sum_{i=1}^{K} \sigma_i^x - \frac{t}{T}\sum_{k}^{K} J_k \sigma_k^2 - C\left(\frac{t}{T}\right)\sum_{l=1}^{L} \sigma_{(l,n)}^z \sigma_{(l,s)}^z \sigma_{(l,e)}^z \sigma_{(l,w)}^z$$

The first term of Expression (5) indicates quantum fluctuations. The second term is an objective term that expresses a combinatorial optimization problem. The third term is a constraint term expressed by many-body interactions.

The arithmetic unit 110 adjusts the intensity schedule function C(t/T) using a hybrid algorithm that uses a value of the intensity schedule function at one time point or each of a plurality of time points as a variational parameter. The hybrid algorithm is an algorithm that updates the variational parameter in such a way that an energy expectation value becomes low based on the results of executing quantum computing.

In other words, the arithmetic unit 110 performs processing of generating the schedule function based on the variational parameter and update processing of updating the variational parameter in such a way that the energy becomes low based on the results of executing quantum annealing shown in Expression (5) using the generated schedule function. Note that the quantum annealing shown in Expression (5) may be performed outside the arithmetic apparatus 100.

The arithmetic unit 110 may generate the intensity schedule function by connecting the variational parameters at the respective time points by a broken line or may generate the intensity schedule function by fitting the variational parameters at the respective time points by a smooth function. Quantum annealing may be executed by a quantum computer or may be performed by executing an algorithm such as a quantum Monte Carlo method on an information processing apparatus. The update processing may be executed by a non-linear optimization method such as a Broyden Fletcher Goldfarb Sharno (BFGS) method.

The arithmetic apparatus 100 according to the first example embodiment adjusts the intensity schedule function of the constraint term of the LHZ model by the hybrid algorithm in such a way that the energy expectation value becomes low. Therefore, the arithmetic apparatus 100 is able to improve the efficiency of quantum annealing on the LHZ model.

Second Example Embodiment

An arithmetic apparatus 100a according to a second example embodiment is a specific example of the first example embodiment. The arithmetic apparatus 100a executes quantum computing using a schedule function fitted with a polynomial function in a hybrid algorithm. In the following description, descriptions that overlap with those of the first example embodiment will be omitted.

Figure 5:
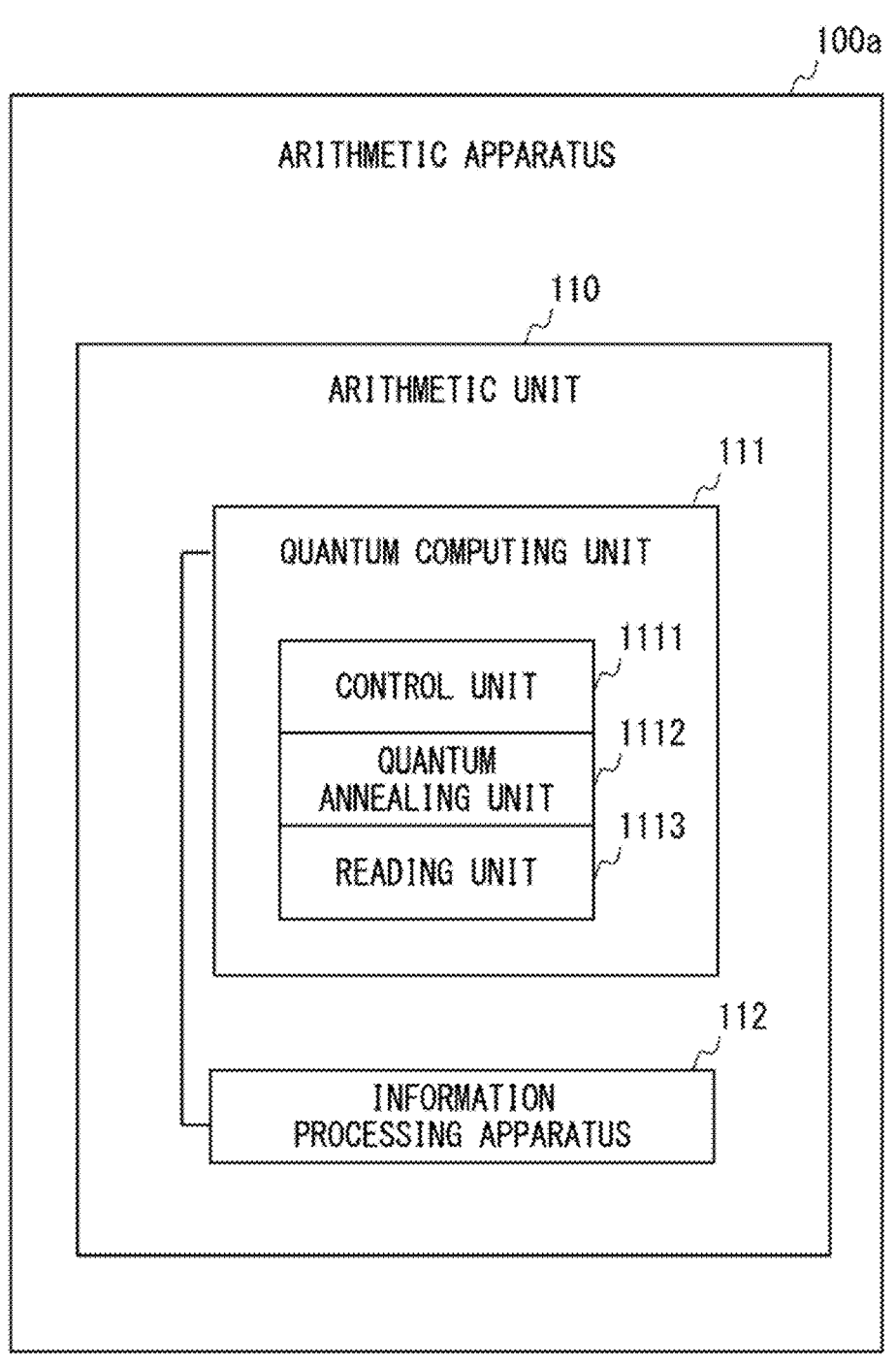
FIG. 5 is a block diagram showing a configuration of an arithmetic apparatus according to a second example embodiment.

FIG. 5 is a block diagram showing a configuration of the arithmetic apparatus 100a. The arithmetic apparatus 100a includes an arithmetic unit 110. The arithmetic unit 110 adjusts an intensity schedule function by a hybrid algorithm that executes fitting processing of fitting the value of the variational parameter at one time point or each of a plurality of time points by a polynomial function and update processing of updating the variational parameter in such a way that an energy expectation value becomes low based on the result of executing quantum annealing on an LHZ model using the polynomial function as the intensity schedule function. As described above, the variational parameter is a parameter for adjusting the intensity schedule function $C(t/T)$.

The arithmetic unit 110 may acquire, after adjusting the intensity schedule function $C(t/T)$ by the hybrid algorithm, the result of executing quantum annealing using the adjusted intensity schedule function $C(t/T)$. The arithmetic unit 110 is therefore able to obtain a solution close to the optimal solution.

The arithmetic unit 110 includes a quantum computing unit 111 that executes quantum annealing and an information processing unit 112 that executes the above fitting processing and the above update processing. Further, quantum annealing after the intensity schedule function $C(t/T)$ is adjusted is also executed by the quantum computing unit 111.

The quantum computing unit 111 includes a control unit 1111, a quantum annealing unit 1112, and a reading unit 1113. The quantum computing unit 111 changes the intensity of the interaction between the plurality of quantum bits that form the LHZ model based on the results of the fitting processing.

The control unit 1111 receives the intensity schedule function $C(t/T)$ from the information processing unit 112 and inputs control signals to the quantum annealing unit 1112. The control signals include a first control signal based on an intensity schedule function $(1-t/T)$ granted to the quantum fluctuation term, a second control signal based on the intensity schedule function $(t/T)$ granted to the objective term, and a third control signal based on the intensity schedule function $C(t/T)$ granted to the constraint term. The control unit 1111 may be a semiconductor device installed at room temperature or may be a superconducting circuit cooled down to an extremely low temperature from about several mK (millikelvin) to about several K.

The quantum annealing unit 1112 is a hardware implementation of the LHZ model. The quantum annealing unit 1112 is a circuit in which a plurality of quantum bit circuits are coupled to one another. The quantum annealing unit 1112 is obtained by, for example, a superconducting circuit using a superconducting material. When the quantum annealing unit 1112 is obtained by a superconducting circuit, the quantum annealing unit 1112 is operated by being cooled down to an extremely low temperature of about several mK. When the quantum annealing unit 1112 is cooled down, it is cooled down using, for example, a dilution refrigerator.

The reading unit 1113 reads out the state of the quantum annealing unit 1112. Specifically, the reading unit 1113 reads out states of a plurality of quantum bit circuits that form the quantum annealing unit 1112. The reading unit 1113 may be a semiconductor device installed at room temperature or may be a superconducting circuit cooled down to an extremely low temperature from about several mK to about several K.

The quantum computing unit 111 may execute quantum annealing, for example, about 10,000 times and calculate the energy expectation value. Note that the quantum computing unit 111 may calculate the energy expectation value using a semiconductor device installed at room temperature (not shown). The quantum computing unit 111 passes the calculated energy expectation value to the information processing unit 112. The information processing unit 112 updates the variational parameter in such a way that the energy expectation value becomes low, fits the updated variational parameter with a polynomial function, and passes the new intensity schedule function $C(t/T)$ to the quantum computing unit 111.

Figure 6:
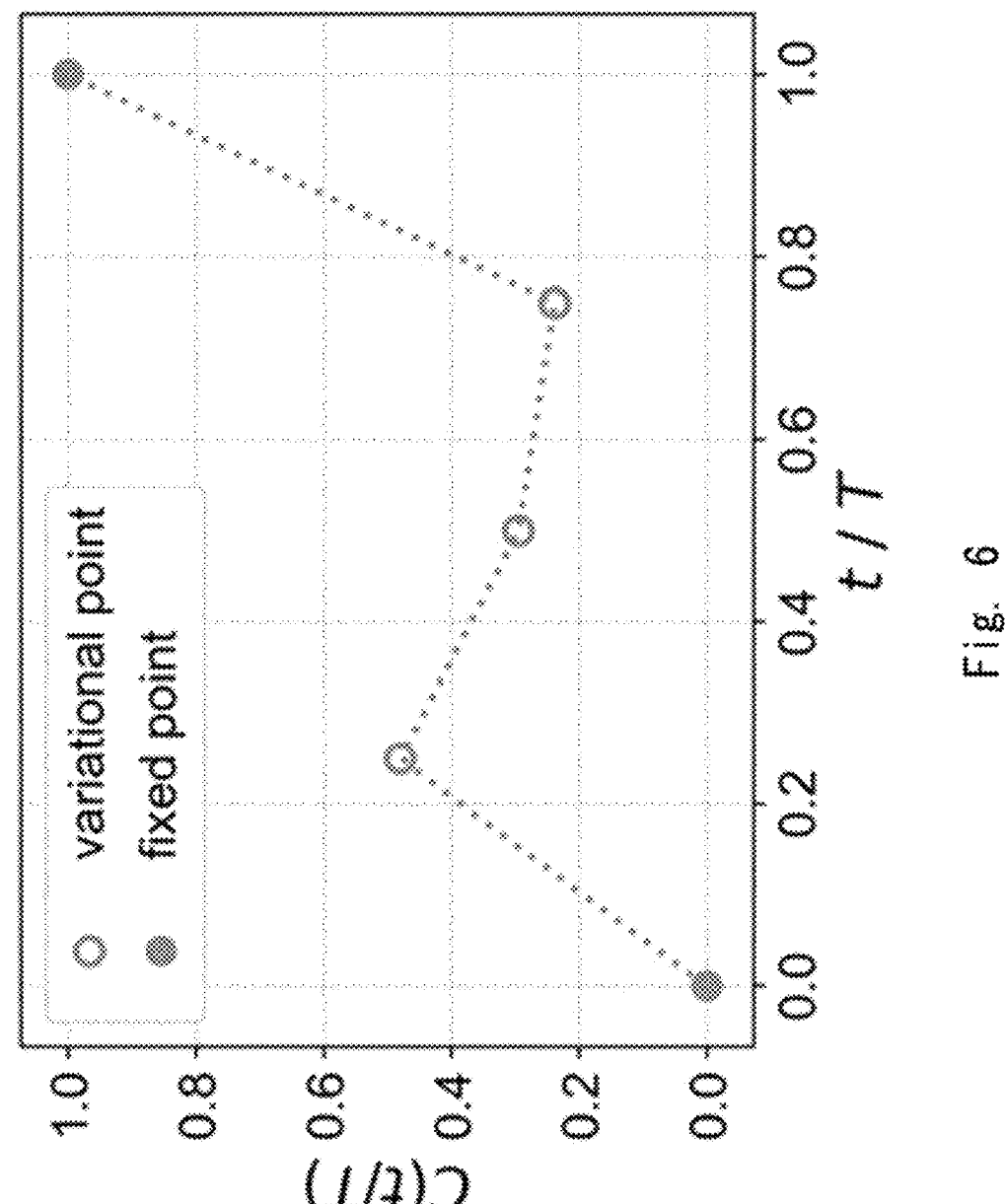
FIG. 6 is a graph showing an intensity schedule function obtained by connecting variational parameters by a broken line.
Figure 7:
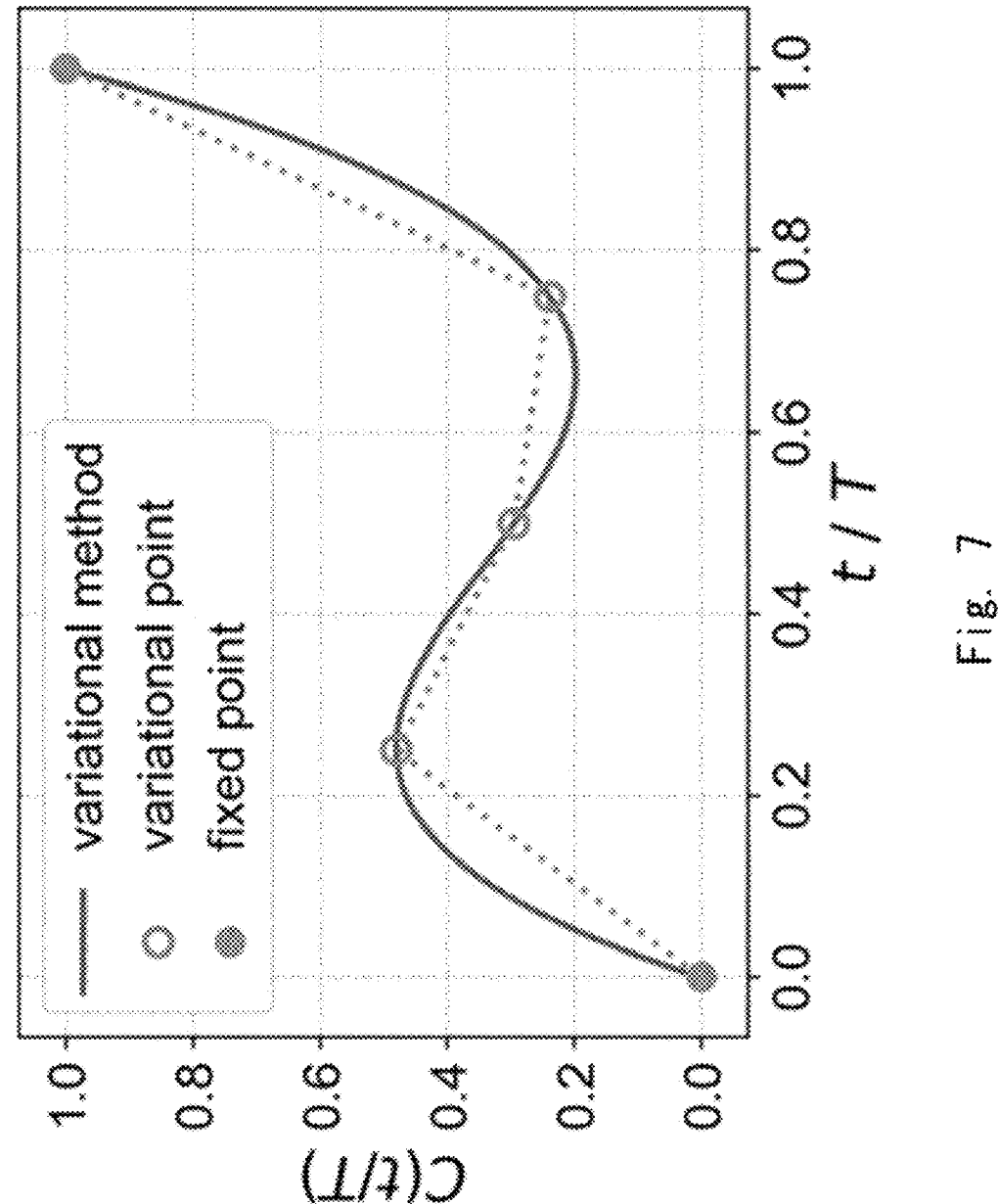
FIG. 7 is a graph showing an intensity schedule function obtained by fitting variational parameters with a polynomial function.

Referring next to FIGS. 6 and 7, the fitting processing will be described in detail. The variational point shown in each of FIGS. 6 and 7 is a point indicating the variational parameters. The variational parameters represent, for example, values of the intensity schedule function $C(t/T)$ at time points $\{1/(S+1)\}, \{2/(S+1)\}, \ldots,$ and $\{S/(S+1)\}$ when the annealing time T is equally divided into S.

FIGS. 6 and 7 each show a case when S=3, and the respective variational parameters indicate the values of the intensity schedule function $C(t/T)$ when time $(t/T)$ is 0.25, 0.5, and 0.75. The fixed points are a point representing a condition that the intensity schedule function $C(t/T)$ becomes 0 when annealing is started and a point representing a condition that the intensity schedule function $C(t/T)$ becomes 1 when annealing is completed.

Quantum annealing may also be executed using a schedule function obtained by connecting the respective points by a broken line as shown by the dotted line in FIG. 6. As already described above, the schedule function that is optimized in Non-Patent Literature 1 does not relate to the constraint term of the LHZ model. On the other hand, the arithmetic apparatus 100a executes quantum annealing using the intensity schedule function $C(t/T)$ obtained by fitting the respective points with a polynomial function, as shown in FIG. 7.

Referring next to FIG. 8, a flow of processing in the arithmetic unit 110 will be described. The aforementioned fitting processing corresponds to Step S104 in FIG. 8 and the aforementioned update processing corresponds to Step S103. The processing shown in Steps S101-S104 is collectively referred to as variational parameter update processing. The variational parameter after the variational parameter update processing is executed m times is denoted by $\{c_{n,m}\}$. The symbol n is an integer equal to or larger than one but is equal to or smaller than $(S-1)$. An initial variational parameter $\{c_{n,0}\}$ that will be described later corresponds to a case in which m=0.

In Step S100, the arithmetic unit 110 sets the initial variational parameter $\{c_{n,0}\}$ and configures an initial intensity schedule function $C_0(t/T)$. The initial variational parameter $\{c_{n,0}\}$ may be defined, for example, in such a way that the initial intensity schedule function $C_0(t/T)=t/T$.

After executing the variational parameter update processing m times, in Step S101, the arithmetic unit 110 inputs the intensity schedule function $C_m(t/T)$ into a quantum annealing machine (the quantum computing unit 111) (Step S101). Note that the intensity schedule function $C_m(t/T)$ is generated in Step S100 when m=0 and is generated in Step S104 that will be described later when m is a value other than 0.

In Step S102, the arithmetic unit 110 executes quantum annealing to calculate the energy expectation value $<E_m>$. In Step S103, the arithmetic unit 110 inputs the variational parameter $\{c_{n,m}\}$ and the energy expectation value $<E_m>$ into the information processing apparatus (the information processing unit 112) and updates the variational parameter $\{c_{n,m}\}$ to $\{c_{n,m+1}\}$. The information processing unit 112 updates a variational parameter so as to further decrease the energy expectation value, which is the calculation result in the quantum annealing.

In Step S104, the arithmetic unit 110 sets a result obtained by fitting the point $\{n/(S+1),c_{n,m+1}\}$ with a polynomial function as a new intensity schedule function $C_{m+1}(t/T)$. The new intensity schedule function may be input to the quantum annealing machine again in Step S101. According to the aforementioned processing, a quantum state that gives a smaller energy expectation value is obtained by quantum annealing.

Next, the reason why the arithmetic apparatus 100a fits the point $\{n/(S+1),c_{n,m}\}$ with a polynomial function will be described. The inventor has executed the hybrid algorithm by connecting the point $\{n/(S+1),c_{n,m}\}$ by a broken line but could not successfully solved the Schrodinger equation. Since the Schrodinger equation including a non-smooth function cannot be appropriately solved, this is considered to be the main reason.

Accordingly, when the simulation is carried out using an intensity schedule function $C(t/T)$ that is not smooth, it is unclear whether the results are reliable, and it is also unclear whether the results can be actually obtained with an actual machine. The inventor has therefore decided to verify the effects of the present disclosure by using a smooth intensity schedule function $C(t/T)$. Then, the inventor has successfully evaluated the effects obtained by the hybrid algorithm appropriately.

Figure 9:
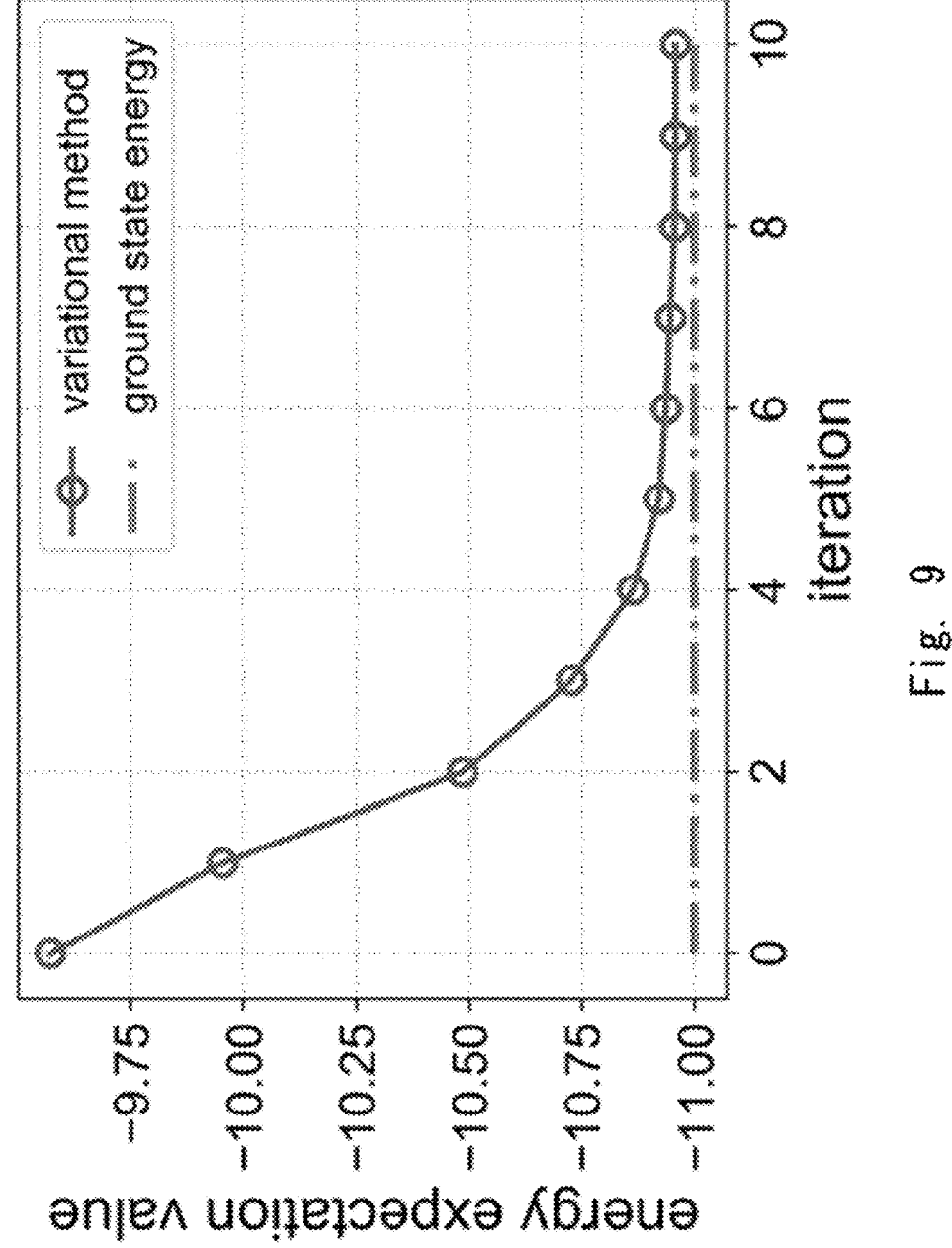
FIG. 9 is a graph showing a change in an energy expectation value when the hybrid algorithm is applied to a problem for which the optimal solution is obvious ($J_k$=0.5)
Figure 10:
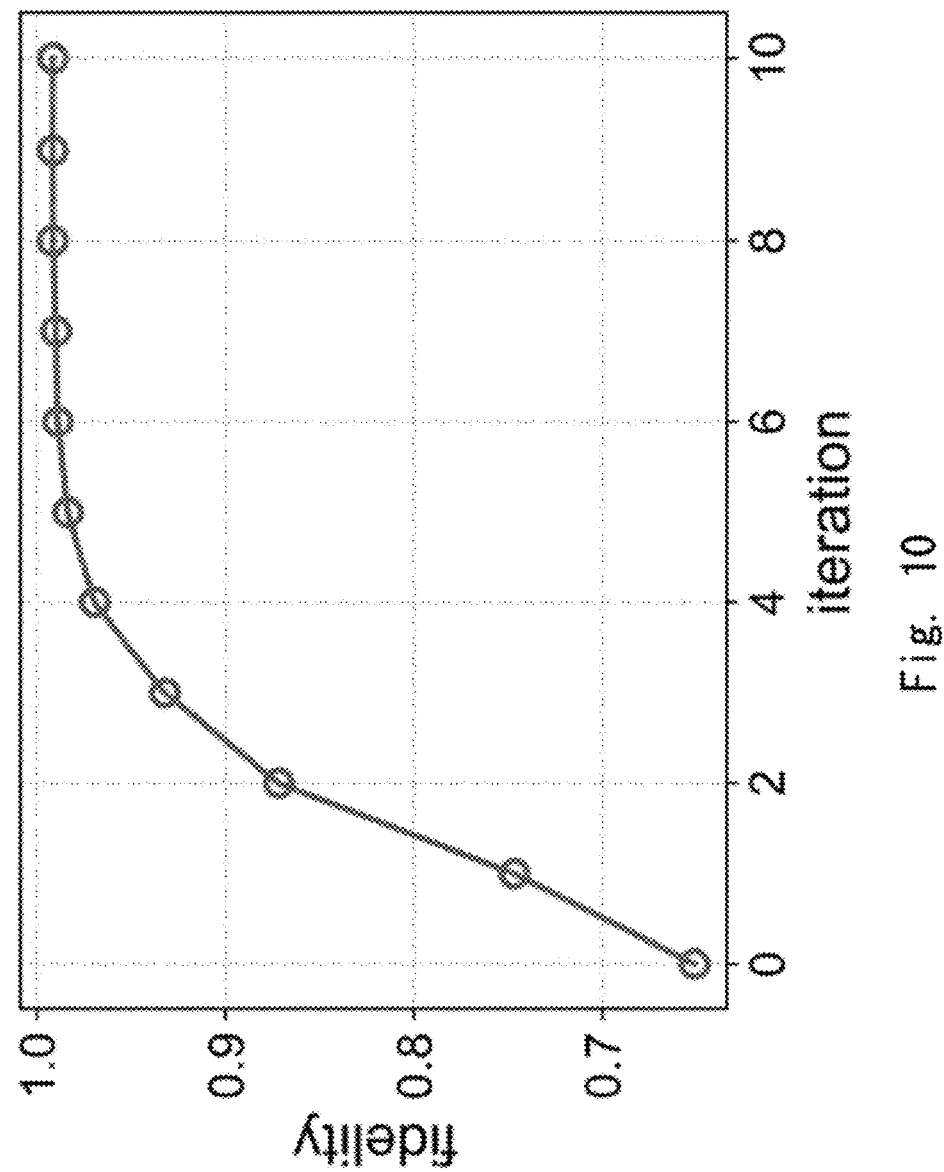
FIG. 10 is a graph showing a change in the fidelity when the hybrid algorithm is applied to the problem for which the optimal solution is obvious ($J_k$=0.5)

FIGS. 9 and 10 are graphs showing simulation results when the method according to the second example embodiment is applied to a problem for which the optimal solution is obvious. A problem where the quantum bit number is 10, T=10, and $J_k$=0.5 has been used as a problem for which the optimal solution is obvious.

When the effects are verified, the inventor has conducted a simulation by solving the Schrodinger equation using an existing python library (Qutip: a standard library used for numerical calculations in quantum mechanics) in the part of quantum annealing. Further, the inventor has also used the existing python optimization library (Scipy) in the part where the information processing apparatus is used.

FIG. 9 is a graph showing changes in the energy expectation value of the solution obtained by quantum annealing with respect to the number of times of the aforementioned variational parameter update processing. The number of times of variational parameter update processing is also called Iteration. The solid line shows the simulation results when the second example embodiment is applied and the alternate long and short dash line shows the energy in the ground state. The lower-limit value that the energy expectation value may have is the energy in the ground state. It is seen from FIG. 9 that the energy expectation value decreases with increasing Iteration. Further, it can be seen that the energy expectation value is lowered down to an energy value almost the same as that in the ground state by repeating the variational parameter update processing about ten times. When Iteration=0, the intensity schedule function $C(t/T)=t/T$, which corresponds to the normal quantum annealing.

FIG. 10 is a graph showing the change in the fidelity with respect to Iteration. The fidelity, which is called a success probability, represents how close the solution obtained by quantum annealing is to the optimal solution. The upper-limit value that the fidelity may take is 1. It can be seen that the fidelity is improved by repeating the variational parameter update processing. Further, by repeating the variational parameter update processing about ten times, the fidelity becomes almost 1. It can be seen from FIGS. 9 and 10 that, every time the hybrid algorithm is looped, the energy expectation value decreases and a solution that is closer to the optimal solution can be successfully searched for.

The intensity schedule function $C(t/T)$ obtained after repeating the parameter update processing ten times is shown in the graph in FIG. 7. It is not obvious that such an intensity schedule function $C(t/T)$ can improve the efficiency of quantum annealing.

Figure 11:
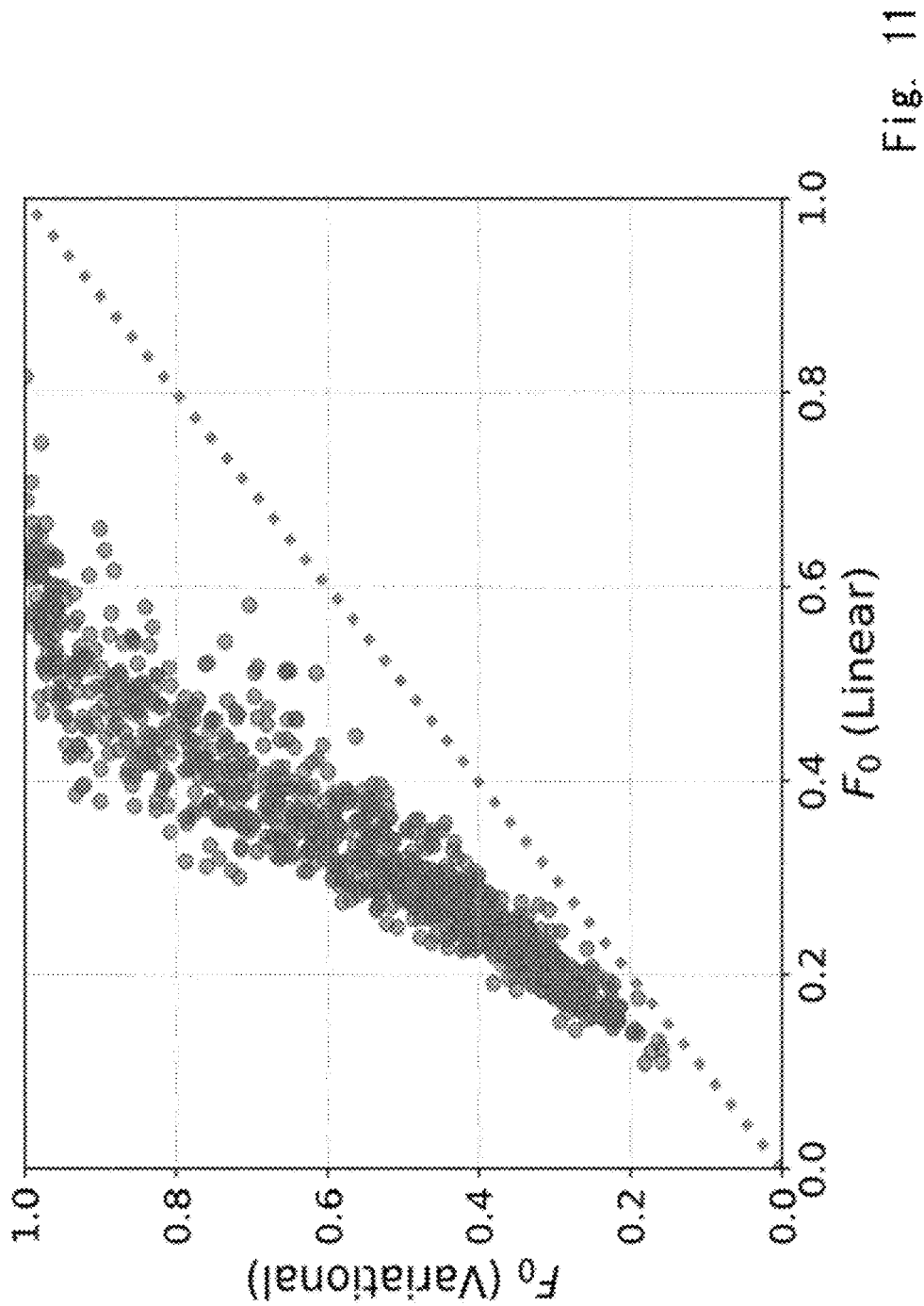
FIG. 11 is a graph showing a difference between the fidelity to an optimal solution in a case in which the hybrid algorithm is applied to a combinatorial optimization problem randomly generated and the fidelity to the optimal solution in a case in which the hybrid algorithm is not applied to the combinatorial optimization problem randomly generated.
Figure 12:
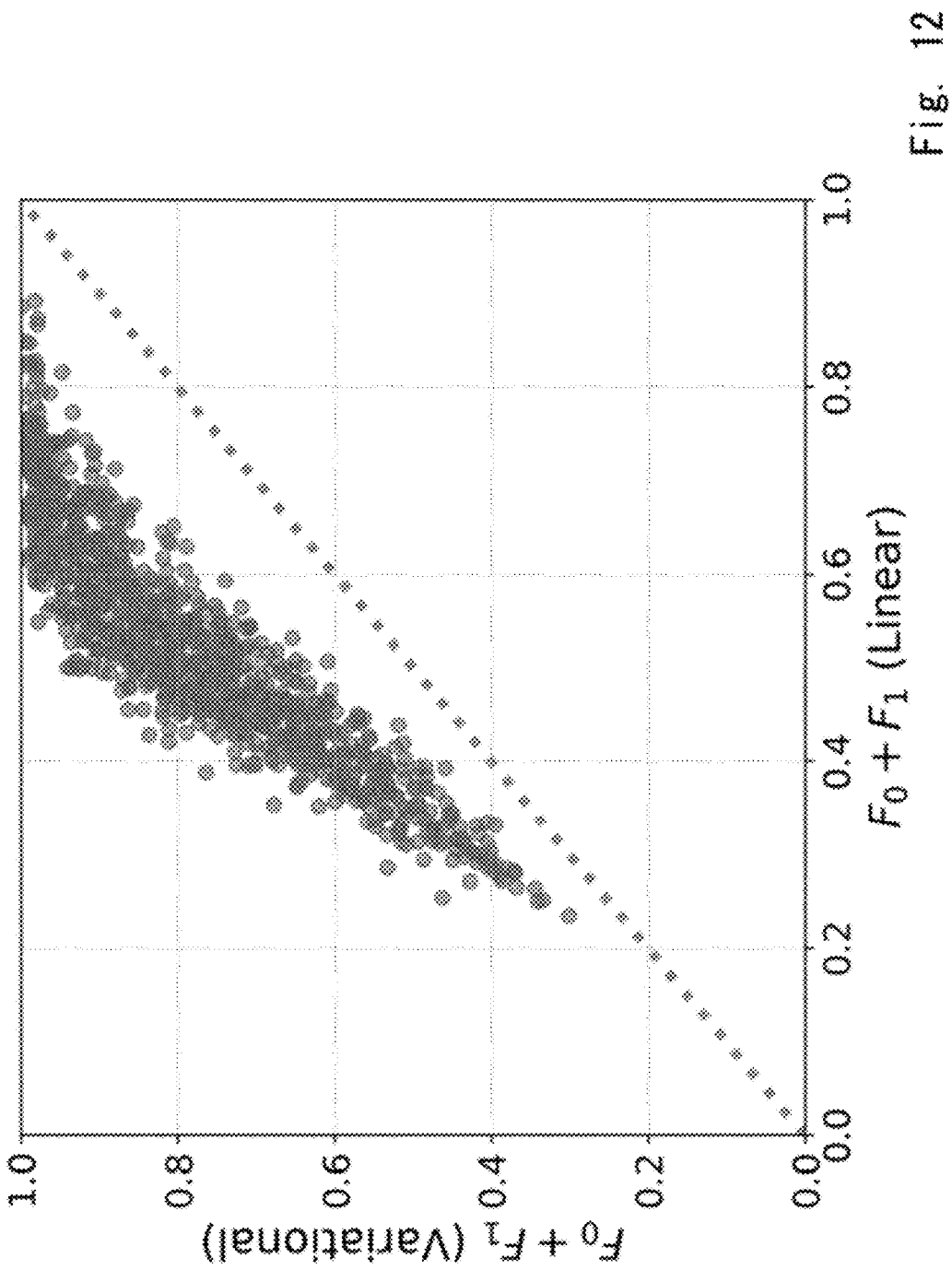
FIG. 12 is a graph showing a difference between the fidelity to an optimal solution and a quasi-optimal solution in the case in which the hybrid algorithm is applied to the combinatorial optimization problem randomly generated and the fidelity to the optimal solution and the quasi-optimal solution in the case in which the hybrid algorithm is not applied to the combinatorial optimization problem randomly generated.

FIGS. 11 and 12 are graphs showing effects of the second example embodiment on a random combinatorial optimization problem. The inventor has conducted a simulation of the hybrid algorithm for combinatorial optimization problems of 1,000 patterns randomly generated where $|Jk|\le0.5$, T=20, and the quantum bit number is 10. The inventor has compared the fidelity when the intensity schedule function $C(t/T)$ is linearly changed ($C(t/T)=(t/T)$) with the fidelity when the intensity schedule function $C(t/T)$ is adjusted by the hybrid algorithm.

The horizontal axis in FIG. 11 indicates the fidelity ($F_0$) when the schedule is linearly changed and the vertical axis indicates the fidelity ($F_0$) when the schedule function $C(t/T)$ is adjusted using the hybrid algorithm. The symbol $F_0$ indicates how close the solution obtained by quantum annealing is to the optimal solution. The respective points correspond to the respective combinatorial optimization problems. The area above the dotted line is an area where the hybrid algorithm is advantageous. The graph in FIG. 11 shows that the efficiency of quantum annealing can be improved by the hybrid algorithm for almost all the combinatorial optimization problems.

FIG. 12 shows results of comparing the fidelity when a quasi-optimal solution is taken into account. The horizontal axis indicates the fidelity ($F_0+F_1$) when the schedule function $C(t/T)$ is linearly changed and the vertical axis indicates the fidelity ($F_0+F_1$) when the schedule function $C(t/T)$ is adjusted by the hybrid algorithm. The symbol $F_1$ indicates how close the solution obtained by quantum annealing is to the quasi-optimal solution (the solution closest to the optimal solution). Like in FIG. 11, the area above the dotted line is the area where the hybrid algorithm is advantageous. The graph in FIG. 12 shows that the efficiency of quantum annealing on the LHZ model can also be improved by the hybrid algorithm in the case in which the quasi-optimal solution is taken into account.

Referring next to FIGS. 13, 14, 15, and 16, results of comparing the case in which the respective variational parameters are connected by a broken line and the case in which the respective variational parameters are fitted with a polynomial function will be described.

Figure 14:
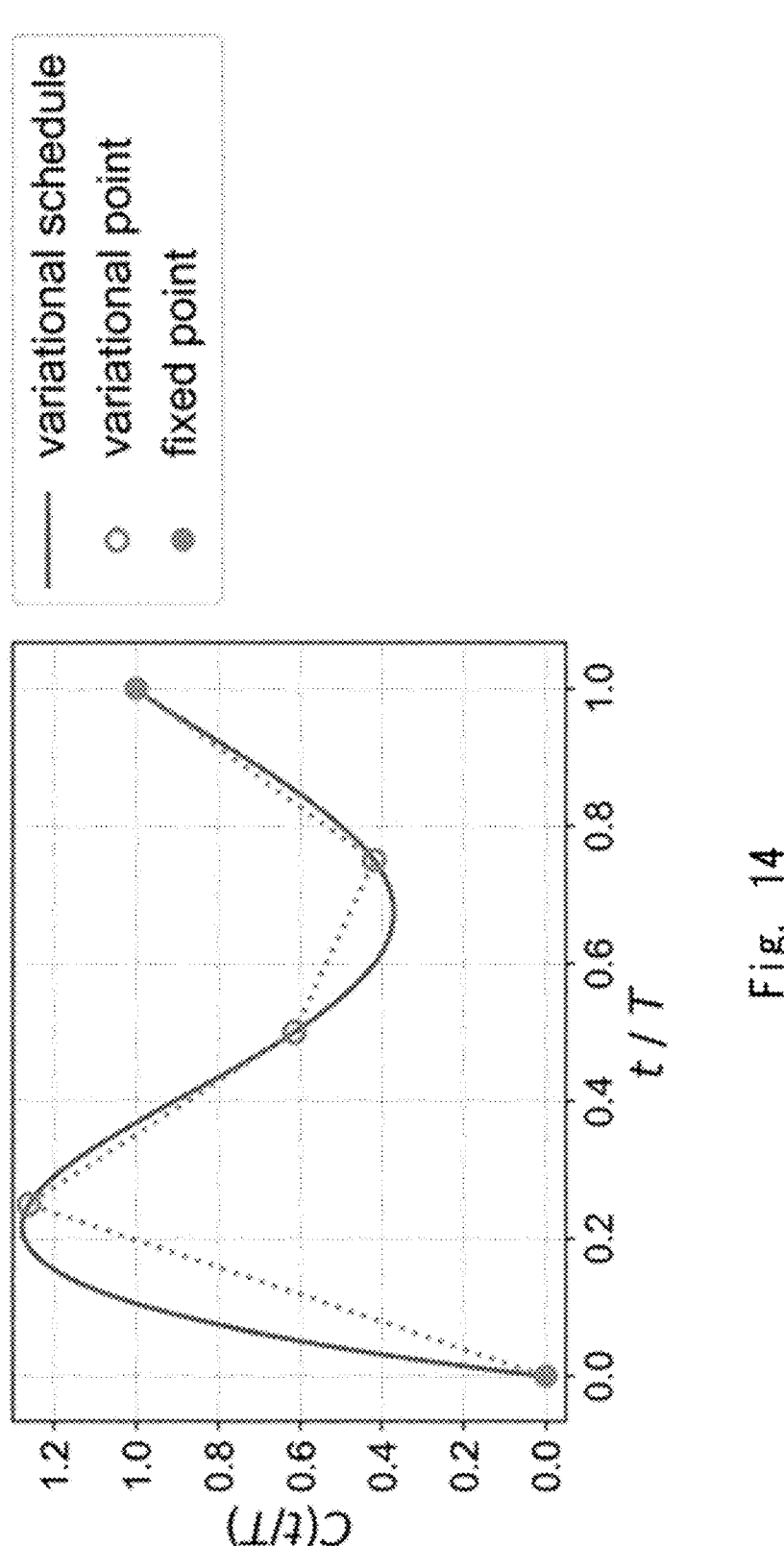
FIG. 14 is a graph showing an intensity schedule function obtained by fitting variational parameters with a polynomial function in the problem for which the optimal solution is obvious ($J_k$=0.2)

The present inventor has conducted a simulation using a problem whose solution is obvious. The present inventor has solved a problem for which the optimal solution is obvious where the quantum bit number is 10, T=10, and $J_k$=0.2. FIG. 13 shows the intensity schedule function $C(t/T)$ when the respective variational parameters are connected by a broken line. FIG. 14 shows the intensity schedule function C(t/T) when the respective variational parameters are fitted with a polynomial function.

Figure 15:
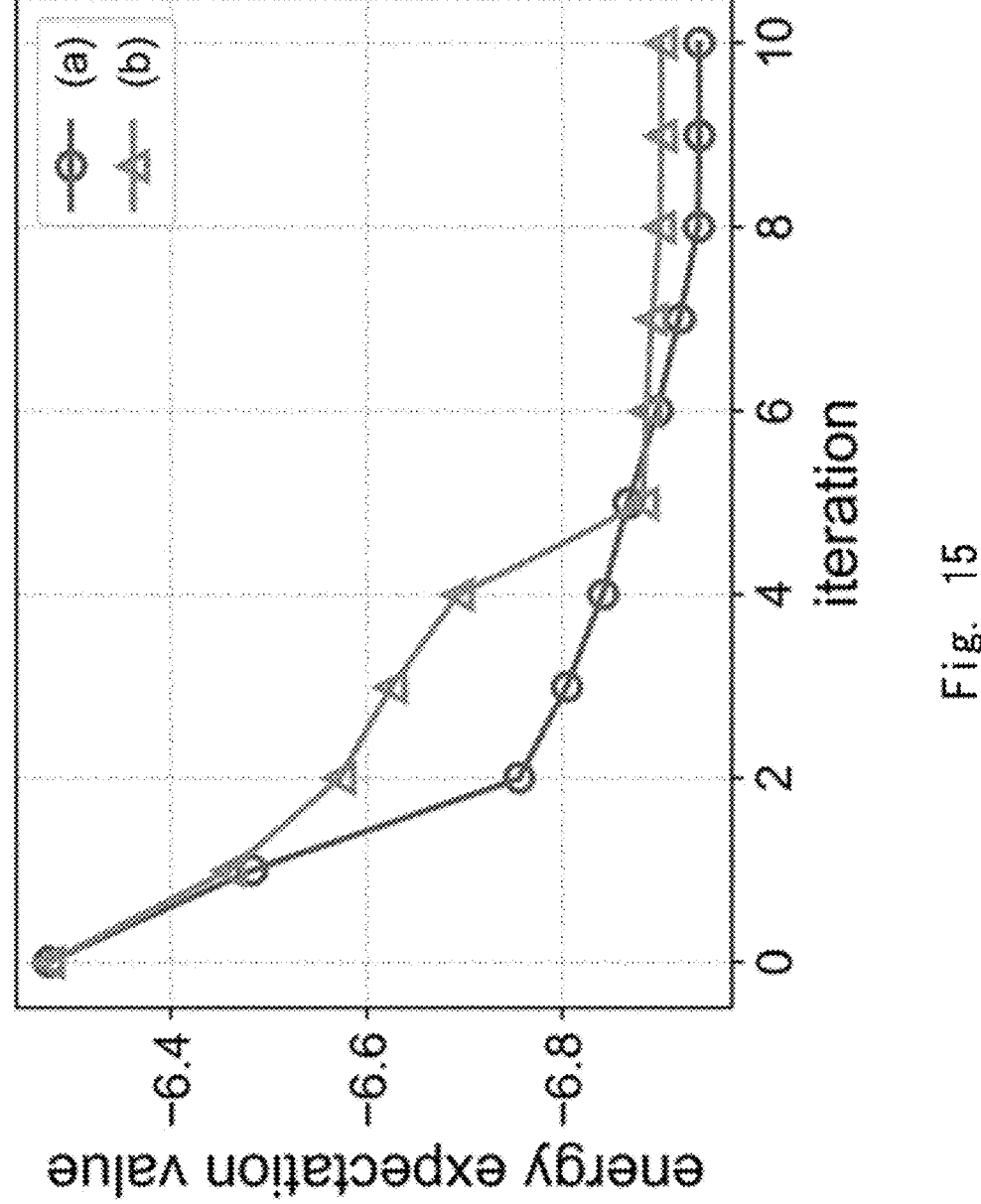
FIG. 15 shows results of comparing an energy expectation value in a case in which the variational parameters are connected by a broken line with an energy expectation value in a case in which the variational parameters are fitted with a polynomial function.
Figure 16:
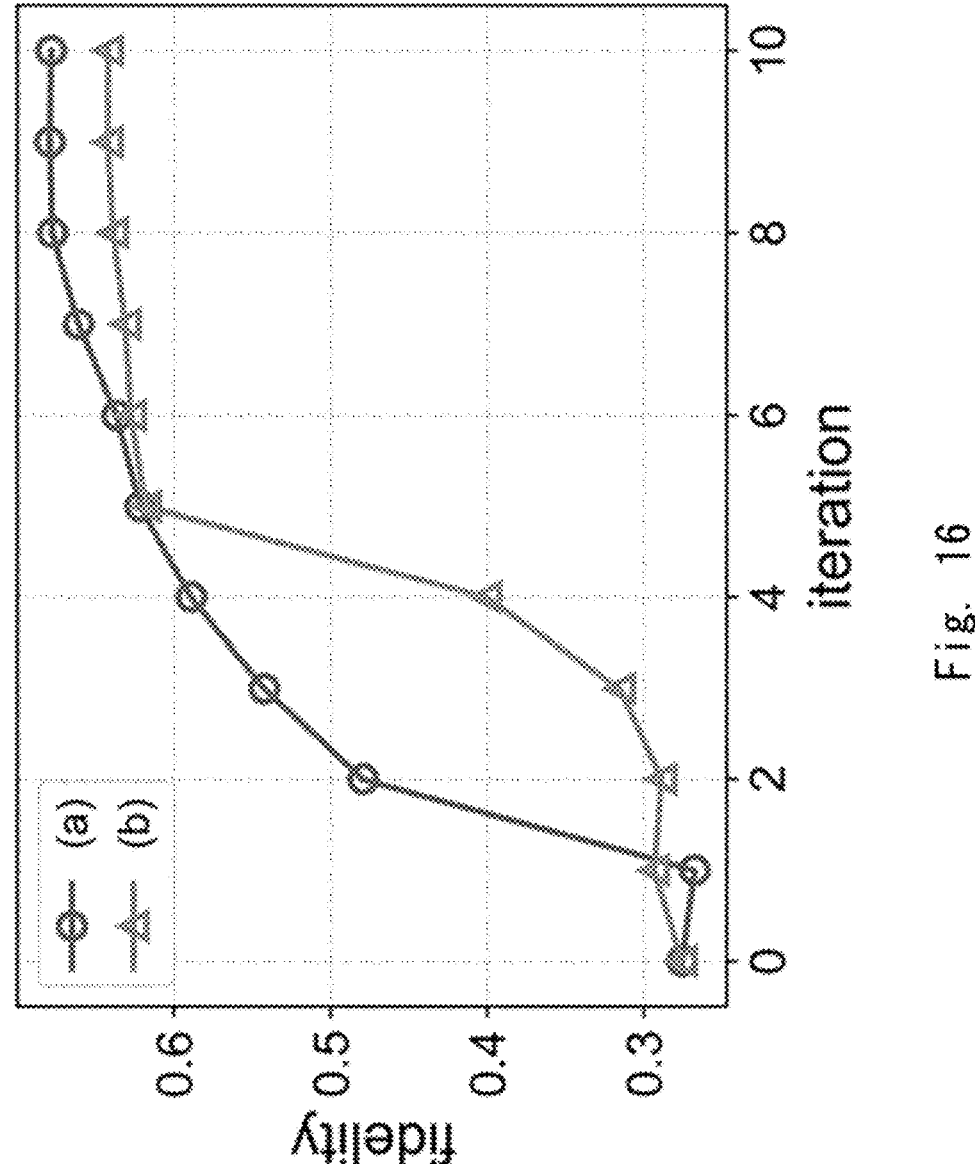
FIG. 16 shows results of comparing the fidelity in the case in which the variational parameters are connected by a broken line and the fidelity in the case in which the variational parameters are fitted with the polynomial function.

The horizontal axis in FIG. 15 indicates Iteration and the vertical axis indicates the energy expectation value. The horizontal axis in FIG. 16 indicates Iteration and the vertical axis indicates fidelity. In FIGS. 15 and 16, the circle symbols (a) indicate the simulation results when the respective variational parameters are fitted with the polynomial function and the triangle symbols (b) indicate the simulation results when the respective variational parameters are connected by a broken line.

Referring to FIG. 15, when Iteration=2-4, the energy expectation values of the symbols (a) are lower than the energy expectation values of the symbols (b). Further, it is seen from FIG. 16 that the fidelity of the symbols (a) is higher than the fidelity of the symbols (b). It is therefore appreciated that the schedule function C(t/T) is optimized earlier in the case in which the variational parameters are fitted with a polynomial function.

Further, when Iteration=10, the energy expectation value of the symbol (a) is lower than the energy expectation value of the symbol (b). Further, the fidelity of the symbol (a) is higher than the fidelity of the symbol (b). It is therefore appreciated that the efficiency of quantum annealing can be further improved in the case in which the variational parameters are fitted with a polynomial function.

Lastly, effects of the second example embodiment will be described. The inventor has appropriately evaluated the effects of the hybrid algorithm by numerically computing the Schrodinger equation with a smooth function appropriately. The obtained evaluation results show that the arithmetic method according to the second example embodiment is also effective in an actual machine as well and can improve the efficiency of quantum annealing on the LHZ model.

The fitting method may be an interpolation method such as spline interpolation, an interpolation using a radial basis function that creates a smooth function. Note that the present disclosure is not limited to the above example embodiments and may be changed as appropriate without departing from the spirit of the present disclosure.

Hardware Configuration Example

Figure 17:
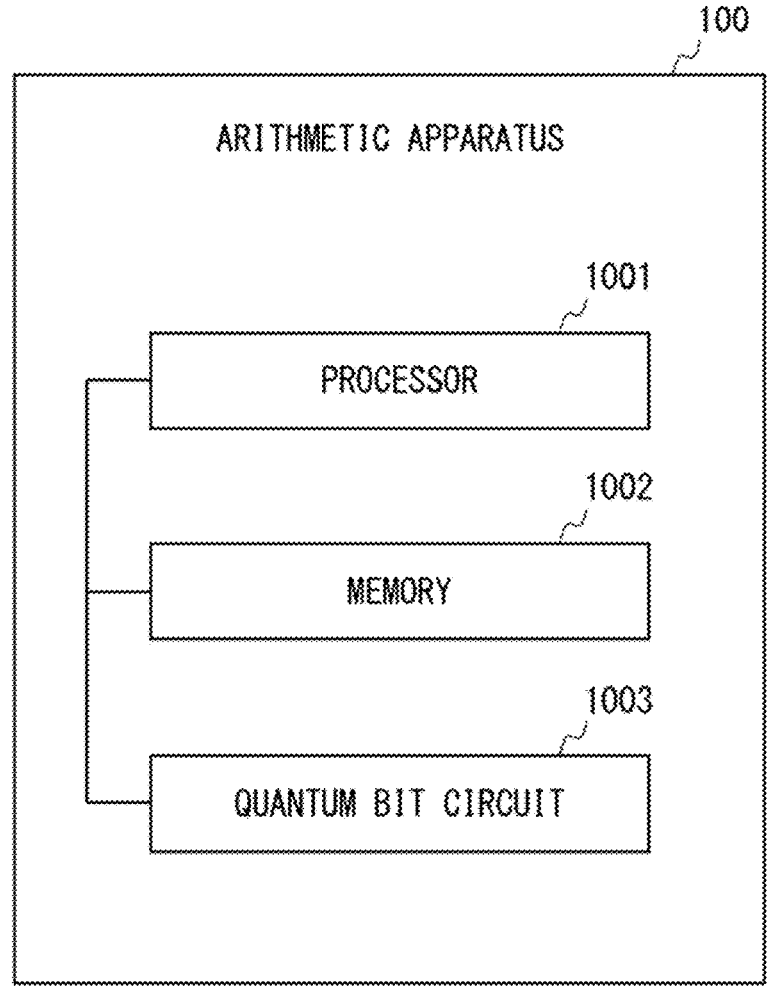
FIG. 17 is a block diagram illustrating a hardware configuration of an arithmetic apparatus.

FIG. 17 is a diagram illustrating a hardware configuration for implementing the arithmetic apparatuses 100 and 100a. The arithmetic apparatuses 100 and 100a each include a processor 1001, a memory 1002, and a quantum bit circuit 1003. The processor 1001 may be various kinds of processors such as a Central Processing Unit (CPU), a Graphics Processing Unit (GPU), or a Field-Programmable Gate Array (FPGA). The processor may be a semiconductor device installed at room temperature or may be a superconductive circuit cooled down to an extremely low temperature from about several mK to about several K. The processing other than the quantum computing in the arithmetic unit 110 may be implemented by the processor 1001 loading the program stored in the memory 1002 and executing the loaded program. The quantum bit circuit 1003 controls the quantum fluctuations of the quantum bit circuit, the strength of the coupling between the quantum bits, and the magnetic field during quantum annealing.

Further, the aforementioned program includes instructions (or software codes) that, when loaded into a computer, cause the computer to perform one or more of the functions described in the example embodiments. The program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc (registered trademark) or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

According to the present disclosure, it is possible to improve the efficiency of quantum annealing on the LHZ model.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

What is claimed is:

1. An arithmetic apparatus comprising:
a quantum computing machine comprising a semiconductor control device and a quantum annealing circuit having an LHZ (Lechner-Hauke-Zoller) model implemented using hardware;
at least one memory storing instructions; and
at least one processor configured to execute the instructions to:
control the semiconductor control device to receive an intensity schedule function; and
control the semiconductor control device to adjust the intensity schedule function in quantum annealing of a constraint term expressed by many-body interactions in the LHZ model by a hybrid algorithm that uses a value of the intensity schedule function at one time point or each of a plurality of time points as a variational parameter, wherein the intensity schedule function is adjusted by the hybrid algorithm, the hybrid algorithm executing fitting processing of fitting the value of the variational parameter at the one time point or each of the plurality of time points by a smooth function and update processing of updating the variational parameter in such a way that an energy expectation value decreases based on a result of executing the quantum annealing on the LHZ model using the smooth function as the intensity schedule function.

2. The arithmetic apparatus according to claim 1, wherein the smooth function is a polynomial function.

3. The arithmetic apparatus according to claim 1, wherein the quantum annealing circuit is configured to change an intensity of interactions between a plurality of quantum bits that form the LHZ model based on a result of the fitting processing.

4. The arithmetic apparatus according to claim 1, wherein the processor is further configured to execute the instructions to:
acquire, after adjusting the intensity schedule function by the hybrid algorithm, the result of executing the quantum annealing based on the adjusted intensity schedule function.

5. The arithmetic apparatus according to claim 1, wherein the quantum annealing circuit comprises a plurality of quantum bit circuits coupled to one another.

6. The arithmetic apparatus according to claim 5, wherein the quantum computing machine further comprises a semiconductor reading device configured to read states of the plurality of quantum bit circuits.

7. An arithmetic method comprising:

controlling a semiconductor control device of a quantum computing machine to receive an intensity schedule function;

controlling a quantum annealing circuit of the quantum computing machine which has an LHZ (Lechner-Hauke-Zoller) model implemented using hardware;

adjusting, using the semiconductor control device, the intensity schedule function in quantum annealing of a constraint term expressed by many-body interactions in the LHZ model by a hybrid algorithm that uses a value of the intensity schedule function at one time point or each of a plurality of time points as a variational parameter; and adjusting, using the semiconductor control device, the intensity schedule function by the hybrid algorithm, the hybrid algorithm executing fitting processing of fitting the value of the variational parameter at the one time point or each of the plurality of time points by a smooth function and update processing of updating the variational parameter in such a way that an energy expectation value decreases based on a result of executing the quantum annealing on the LHZ model using the smooth function as the intensity schedule function.

8. The arithmetic method according to claim 7, wherein the smooth function is a polynomial function.

9. The arithmetic method according to claim 7, comprising changing an intensity of interactions between a plurality of quantum bits that form the LHZ model based on a result of the fitting processing.

10. A non-transitory computer readable medium storing a program causing a computer to execute processing of:

controlling a semiconductor control device of a quantum computing machine to receive an intensity schedule function;

controlling a quantum annealing circuit of the quantum computing machine which has an LHZ (Lechner-Hauke-Zoller) model implemented using hardware;

adjusting, using the semiconductor control device, the intensity schedule function in quantum annealing of a constraint term expressed by many-body interactions in the LHZ model by a hybrid algorithm that uses a value of the intensity schedule function at one time point or each of a plurality of time points as a variational parameter; and adjusting, using the semiconductor control device, the intensity schedule function by the hybrid algorithm, the hybrid algorithm executing fitting processing of fitting the value of the variational parameter at the one time point or each of the plurality of time points by a smooth function and update processing of updating the variational parameter in such a way that an energy expectation value decreases based on a result of executing the quantum annealing on the LHZ model using the smooth function as the intensity schedule function.

\* \* \* \* \*